United States Patent [19]
Kamerman et al.

[11] Patent Number: 5,519,834
[45] Date of Patent: May 21, 1996

[54] METHOD OF TRANSMITTING SELECTED MESSAGE FRAMES WITHOUT INDIVIDUAL DESTINATION ADDRESS IN NON-OVERLAPPING SEQUENTIAL TIME INTERVALS FROM HOST COMPUTER TO TERMINALS VIA BRIDGES AND RETRANSMITTING THEREAFTER

[75] Inventors: Adriaan Kamerman, Nieuwegein; Johannes P. N. Haagh, Eindhoven, both of Netherlands

[73] Assignee: NCR Corporation, Dayton, Ohio

[21] Appl. No.: 927,986

[22] Filed: Aug. 11, 1992

[30] Foreign Application Priority Data

Dec. 12, 1991 [GB] United Kingdom .................. 9127404

[51] Int. Cl.⁶ ............................. G06F 13/12; G06F 13/14
[52] U.S. Cl. ................... 395/200.06; 395/200.05; 395/200.09; 395/200.12; 395/200.15; 395/200.19; 395/840; 395/857; 395/865; 364/935.4; 364/940.65; 364/942.1; 364/DIG. 2; 364/949.91
[58] Field of Search ..................... 395/200; 364/242.95; 370/94, 61; 371/69.1; 340/825.1, 825.11, 825.53

[56] References Cited

U.S. PATENT DOCUMENTS

| | | | |
|---|---|---|---|
| 3,349,374 | 10/1967 | Garbrielem et al. | 371/69.1 |
| 4,072,898 | 2/1978 | Hellman et al. | 375/23 |
| 4,093,825 | 6/1978 | Gladstone et al. | 371/69.1 |
| 4,133,504 | 1/1979 | Dobler et al. | 371/69.1 |
| 4,290,134 | 9/1981 | Hamphire | 370/92 |
| 4,706,081 | 11/1987 | Hart et al. | 340/825.03 |
| 4,789,983 | 12/1988 | Acampora et al. | 364/200 |
| 4,876,742 | 10/1989 | Vacon et al. | 340/825.5 |
| 5,157,687 | 10/1992 | Tymes | 371/1 |
| 5,159,592 | 10/1992 | Perkins | 340/825.5 |

FOREIGN PATENT DOCUMENTS

| | | |
|---|---|---|
| 0222308 | 11/1986 | European Pat. Off. . |
| 0281334 | 2/1988 | European Pat. Off. . |
| 0405074 | 4/1990 | European Pat. Off. . |
| 8807794 | 10/1988 | WIPO . |

OTHER PUBLICATIONS

"System Load Protocol" by Technical Committee on Computer Communications of the IEEE Computer Society, approval dates of May 31, 1990 and Oct. 12, 1990, 1991.

"Media Access Control (MAC) Bridges" by Technical Committee on Computer Communications of the IEEE Computer Society, approval dates of May 21, 1990 and Oct. 18, 1990, 1991.

Computer Communications Review, vol. 18, No. 4, Aug. 1988, New York US pp. 274–281 J. S. J. Daka et al 'A High Performance Broadcast File Transfer Protocol'.

Data Communications, vol. 19, No. 7, Jun. 1990, New York US pp. 109–112 S. Saunders 'Radio-based LAN breaks the size Barrier!

*Primary Examiner*—Thomas C. Lee
*Assistant Examiner*—Le Hien Luu
*Attorney, Agent, or Firm*—Elmer Wargo

[57] ABSTRACT

A local area network system (10) includes a host computer (14) connected in a wired LAN (12) with a plurality of bridges (18). The bridges (18) further connect with respective wireless LANs (100, 200, . . . , 600) which operate on a common wireless communication channel and contain respective pluralities of terminals (102, 202, . . . , 602). When a download operation is effected for initially starting up a new added terminal (e.g. 102-1), the bridges (18) are adapted to identify download message frames issued by the host computer (14) and retransmit each such frame (400) over the wireless communication channel in non-overlapping time intervals by applying respective different delays. Also, each download message frame is transmitted twice by each of the bridges (18).

2 Claims, 3 Drawing Sheets

METHOD OF TRANSMITTING SELECTED MESSAGE FRAMES WITHOUT INDIVIDUAL DESTINATION ADDRESS IN NON-OVERLAPPING SEQUENTIAL TIME INTERVALS FROM HOST COMPUTER TO TERMINALS VIA BRIDGES AND RETRANSMITTING THEREAFTER

BACKGROUND OF THE INVENTION

1. Field of Invention

This invention relates to local area network systems.

2. Background Information

Local area networks (LANs) using wired interconnections have the disadvantage that extensive cabling is required to interconnect the stations. The provision of such cabling is generally inconvenient and gives rise to inflexibility if it is desired to alter the physical locations of the stations. Wireless transmission links, operating at radio frequencies, have been used to replace the cabling interconnections of a LAN. However, certain problems are associated with the use of a wireless transmission link, particularly for LANs in an indoor environment. One problem associated with wireless LANs operated over radio frequency links is that the radio frequency band is a scarce resource. In order to economize with this resource, it is desirable for stations to utilize the same frequency band.

If the application dictates that a large number of stations be interconnected, then, in order to avoid overloading the LAN, it is desirable that groups of stations be interconnected into separate LANs. Such LANs can be interconnected by bridges. Such bridges are well known devices and are the subject of IEEE Standard 802.1D. However, where a single wireless transmission channel is utilized, a problem arises if stations of one LAN have overlapping coverage areas with stations of another LAN. In this situation, interference may arise between stations of different LANs, possibly causing the loss of some transmitted message frames. Although error recovery procedures are available in some circumstances to recover lost frames, such procedures are not always convenient to apply in some practical implementations.

SUMMARY OF THE INVENTION

It is an object of the present invention to provide a method and apparatus for transmitting messages from a host computer to a plurality of terminals, using a wireless transmission link, wherein high reliability is achieved.

Therefore, according to one aspect of a preferred embodiment of the present invention, there is provided a method of transmitting message frames from a host computer to a plurality of terminals characterized by the steps of: providing a plurality of bridges communicating via respective first ports with said host computer and communicating via respective second ports over a common wireless communication channel with respective wireless local area networks containing respective pluralities of said terminals, transmitting said message frames from said host computer to said bridges and retransmitting selected message frames from said bridges over said wireless communication channel, such that each selected message frame is transmitted in non-overlapping time intervals by all of said bridges.

According to another aspect of the present invention, there is provided a local area network system including a host computer and a plurality of terminals, characterized by a plurality of bridges connected via respective first ports with said host computer and connected via respective second ports over a common wireless communication channel with respective wireless local area networks containing respective pluralities of said terminals, wherein said bridges are adapted to retransmit selected message frames over said wireless communication channel, such that each selected message frame is transmitted in non-overlapping time intervals by all of said bridges.

A preferred embodiment of the present invention will now be described by way of example, with reference to the following specification, claims and drawing.

DETAILED DESCRIPTION OF THE INVENTION

Figure 1:
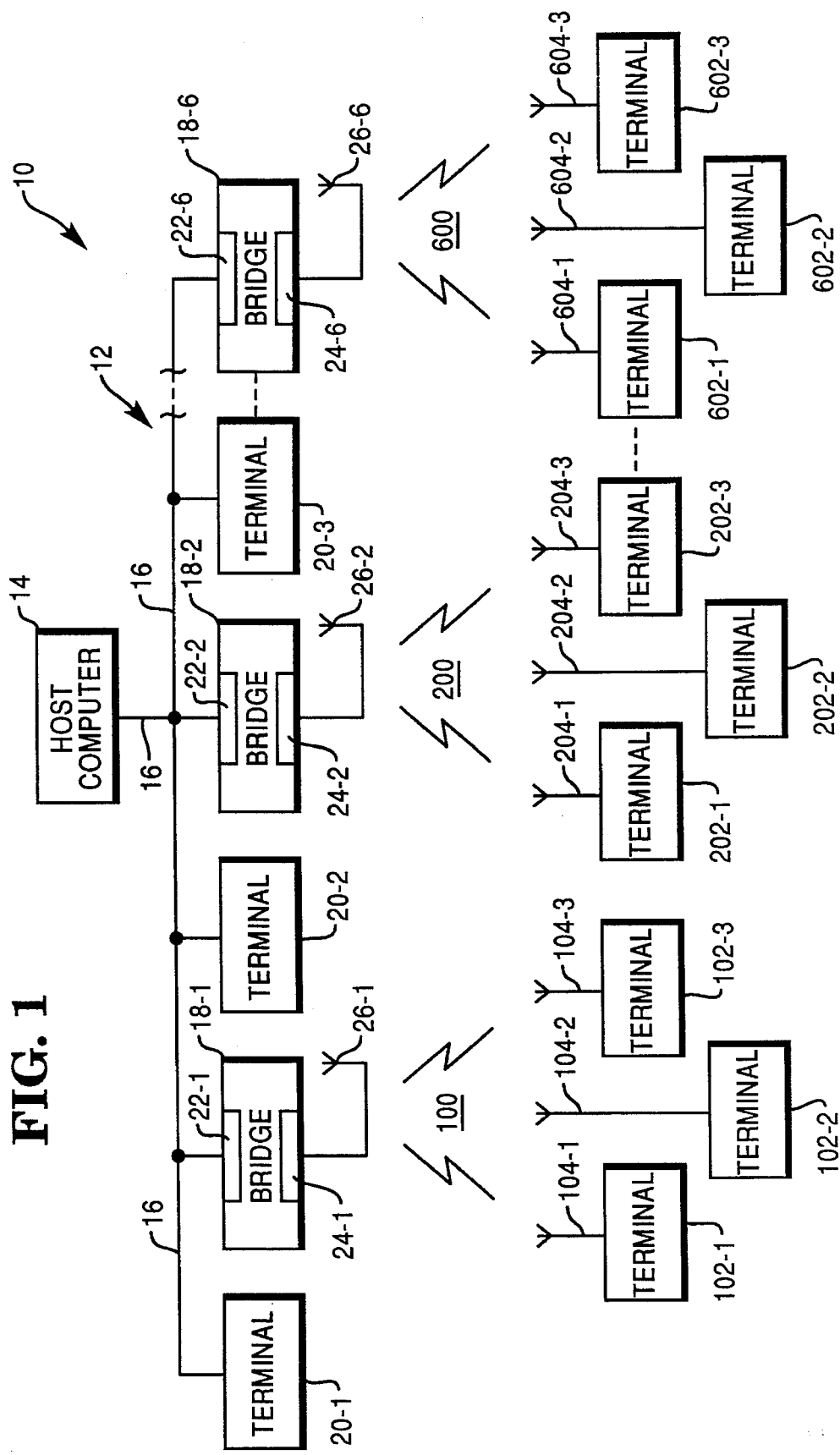
FIG. 1 is a block diagram of a local area network system according to this invention.

Referring now to FIG. 1, there is shown a local area network (LAN) system 10. The system 10 includes a wired LAN 12 which is formed by a host computer 14 connected by cabling 16 to a plurality of bridges 18, referred to individually as bridge 18-1, bridge 18-2, etc. In the described embodiment six bridges 18 are utilized, but the total number of bridges 18 may be varied according to a particular implementation. Also, optionally connected in the wired LAN 12 are a plurality of terminals referenced individually as terminal 20-1, terminal 20-2, and terminal 20-3. The number of terminals 20 is arbitrary, and in some environments, the terminals 20 may be omitted altogether, such that only the host computer 14 and the bridges 18, are connected into the LAN 12. The host computer 14, the bridges 18, and the terminals 20 may be implemented by personal computers (PCs).

The bridges 18 have respective first ports 22 referenced individually as port 22-1, port 22-2, etc., and respective second ports 24, referenced individually as port 24-1, port 24-2, etc. . . . Each bridge 18 connects via its first port 22 with the LAN 12 and via its second port 24 with a respective wireless LAN. In the described embodiment there are six wireless LANs, 100, 200, . . . , and 600. Each second port 24 communicates with its associated wireless LAN via an antenna 26, referenced individually as antenna 26-1, antenna 26-2, etc.

In the described embodiment each wireless LAN 100, 200, . . . , and 600 is shown as having three terminals included therein, although it will be appreciated that this is merely by way of example. Each wireless LAN could have any desired number of terminals, and the number of terminals in the respective wireless LANs is not necessarily the same. The wireless LAN 100 is shown as comprising terminals 102, referenced individually as terminal 102-1, terminal 102-2, and terminal 102-3. The respective terminals have antennas 104, referenced individually as antenna 104-1, antenna 104-2, and antenna 104-3. Similarly, the wireless LAN 200 comprises terminals 202, referenced individually as terminal 202-1, terminal 202-2, and terminal 202-3, having respective antennas 204, referenced individually as antenna 204-1, antenna 204-2, and antenna 204-3. The remaining wireless LANs (only LAN 600 is shown) have analogously identified terminals.

It should be understood that the LAN 12 operates as a conventional Starlan network at a 1 Megabit per second rate, utilizing a conventional CSMA/CD (Carrier Select Multiple Access with Collision Detection) medium access protocol. The wireless LANs 100, 200, ..., and 600 operate at a 2 Megabits per second rate utilizing a CSMA/CA (Carrier Select Multiple Access with Collision Detection) medium access protocol. With this protocol, if a station (terminal or bridge) in the network wishes to transmit a data frame, but the transmission channel is sensed as busy, transmission of the data frame is deferred, and after the carrier becomes inactive, a new attempt is made to transmit the frame after a random backoff time.

The wireless LANs 100, 200, ..., and 600 operate over a common wireless communication channel. The bridges 18 may have overlapping coverage areas. For example, the wireless coverage area of the bridge 18-1 may partially overlap the wireless coverage area of the bridge 18-2. With this arrangement, it will be appreciated that there is a small risk that message frames can get lost, despite the use of the CSMA/CA protocol. Thus, message frames can get lost where wireless LAN stations (bridge or terminal) transmit parallel-in-time. Such parallel-in-time transmission can occur because the CSMA/CA protocol avoids this only when LAN stations are in the coverage area of each other. By way of example, assume that terminal 102-3 is in the coverage range of bridges 18-1 and 18-2, but the bridges 18-1 and 18-2 are outside each other's covering range. Then, the transmission of a message frame from the bridge 18-1 to the terminal 102-3 could be corrupted by a transmission by the bridge 18-2. This is because, in the environment of a wireless LAN, in order to achieve reliable reception, a receiving station requires a certain capture ratio, for example 10 dB, for the received signal over other signals in the channel, and the transmission by the interfering bridge 18-2 may prevent this ratio being achieved for the reception of the transmission by the bridge 18-1. Also, it will be appreciated that even within a single one of the wireless LANs 100, 200, ..., and 600, there is a (very slight) chance of two transmissions commencing substantially simultaneously and the two transmissions corrupting each other, despite the use of the CSMA/CA protocol.

The described system 10 has a particular application in a retail shop or store, where the terminals 20, 102, 202, ..., and 602 are retail terminals, and the system operates under the general control of the host computer 14, although it should be understood that other applications are possible. It will be appreciated that in such an environment, it is advantageous to use wireless transmissions in order to avoid the need for cabling. Terminals can very easily be added to or removed from the system 10.

In the retail system environment, various types of messages are transmitted in the system 10. Thus, all the terminals 20, 102, 202, ..., and 602 are polled with "alive" messages at predetermined time intervals, for example 20 seconds, to determine whether the terminals are active. Also, when a retail transaction is effected, numerous message frames are transmitted in each direction between the terminal effecting the transaction and the host computer 14, including item price look-up message frames and transaction initiating and terminating message frames. Nevertheless, it is found that in such a retail system the total load factor of all partially overlapping wireless LANs 100, 200, ..., and 600 is very low. Therefore, only a very small proportion of transmitted frames are lost in the manner described hereinabove. "Alive" and transaction message frames that are lost on the "Physical Layer" can be recovered by known procedures on the "Logical Link Layer", in accordance with the known IEEE 802.2 standard using sequence numbering for the message frames.

For the transmission of such "alive" and transaction messages, each bridge 18 applies the known spanning tree algorithm, in accordance with IEEE Standard 802.1D, for example, whereby it is ensured that message frames from the host computer 14, which include a destination address for the frame, are retransmitted by only one bridge 18. For this purpose, each bridge 18 includes a database identifying the terminals which are "below" that bridge for the purpose of the spanning tree algorithm. The database acts as a filtering database for the message frames and is updated by source address information in the message frames from the wireless terminals 102, 202, ..., and 602, directed to the host computer 14.

The terminals 102, 202, ..., and 602 are diskless and will start up using a boot ROM (not shown). When a terminal is added to the system 10, for example, a download procedure of a large number of information frames is required to supply programming information and set up the terminal in accordance with the particular application. Initially, at start up, a terminal 102, 202, ..., and 602 generates a Load Request Message, which advises the relevant bridge 18 that the terminal is below that bridge. In this connection, it should be understood that each terminal 102, 202, ..., and 602 is assigned to a particular bridge, such assignment being based on network identification codes (NWID codes at the Physical Layer), which codes identify the respective wireless LANs 100, 200, ..., and 600.

A download operation from the host computer 14 to the terminals is made initially to start up the system 10. Also, a download operation can be effected for one or more of the terminals while the system 10 is operational, upon request from a terminal, for example, as by a newly added terminal.

A download operation will now be described by way of example, with reference to FIGS. 2 and 3. A download operation is commenced by a terminal issuing an "Initiate Load" message to the host computer 14. Assume that the terminal 102-1 issues such a message. The host computer issues a "Response Load" message for the terminal 102-1 and for any other terminal which also has issued an "Initiate Load" message within a predetermined time interval determined by a timer (not shown) in the host computer 14. Assume that the terminal 202-1 has also issued an Initiate Load message. Next, the terminals 102-1 and 202-1 each send a "Load Configuration" message to the host computer 14. The download now starts. In the download, a sequence of approximately 1000 "Load Record" message frames, designated "Unnumbered Information" frames, of 550 bytes each, is sent to the terminals, with a frame separation time of 200 milliseconds (corresponding to the MinBlockDelay parameter time mentioned in the IEEE Standard 802.1E). Finally, an "End of Load" message is sent by the host computer 14 to the terminals and the individual terminals respond with a "Status Response" message.

Figure 2:
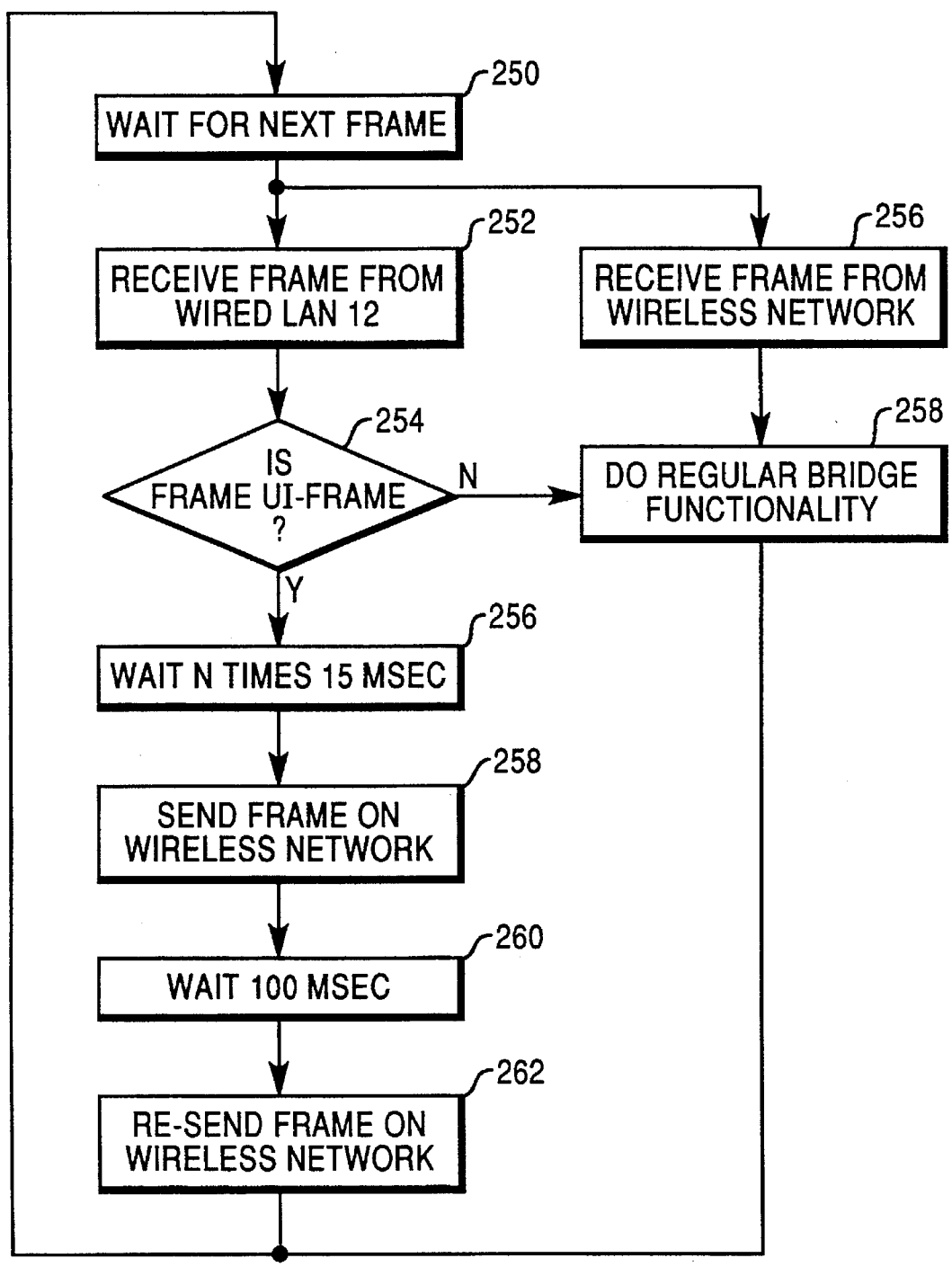
FIG. 2 is a flowchart illustrating the operation of bridges included in the local area network system of FIG. 1.

Referring to FIG. 2, there is shown a flowchart for the operation of a bridge 18. In a wait state, the bridge 18 waits for the next frame (box 250). If a frame is received from the wired LAN 12 (box 252), a determination is made as to whether the frame is a download (UI) frame (box 254). If a frame is received from the relevant wireless LAN 100, 200, ..., and 600 (box 256), the normal bridge functionality is effected (box 258); for example, the frame is transmitted to the host computer 14, and the bridge 18 returns to the wait state (box 250). Returning to box 254, if the frame received from the wired LAN 12 is not a download frame, as for example, if the frame relates to an "alive" message or is a transaction frame, then the normal bridge functionality is effected (box 258); for example, the frame is transmitted to the relevant destination terminal over the wireless channel, and the bridge returns to the wait state (box 250). If in box 254, it is determined that the frame is a download (UI) frame, then a time interval of N times 15 milliseconds is timed, where N is 0 for bridge 18-1, 1 for bridge 18-2, 2 for bridge 18-3, and so forth. After the elapse of such time interval, the download frame is transmitted by the bridge over the wireless channel.

Figure 3:
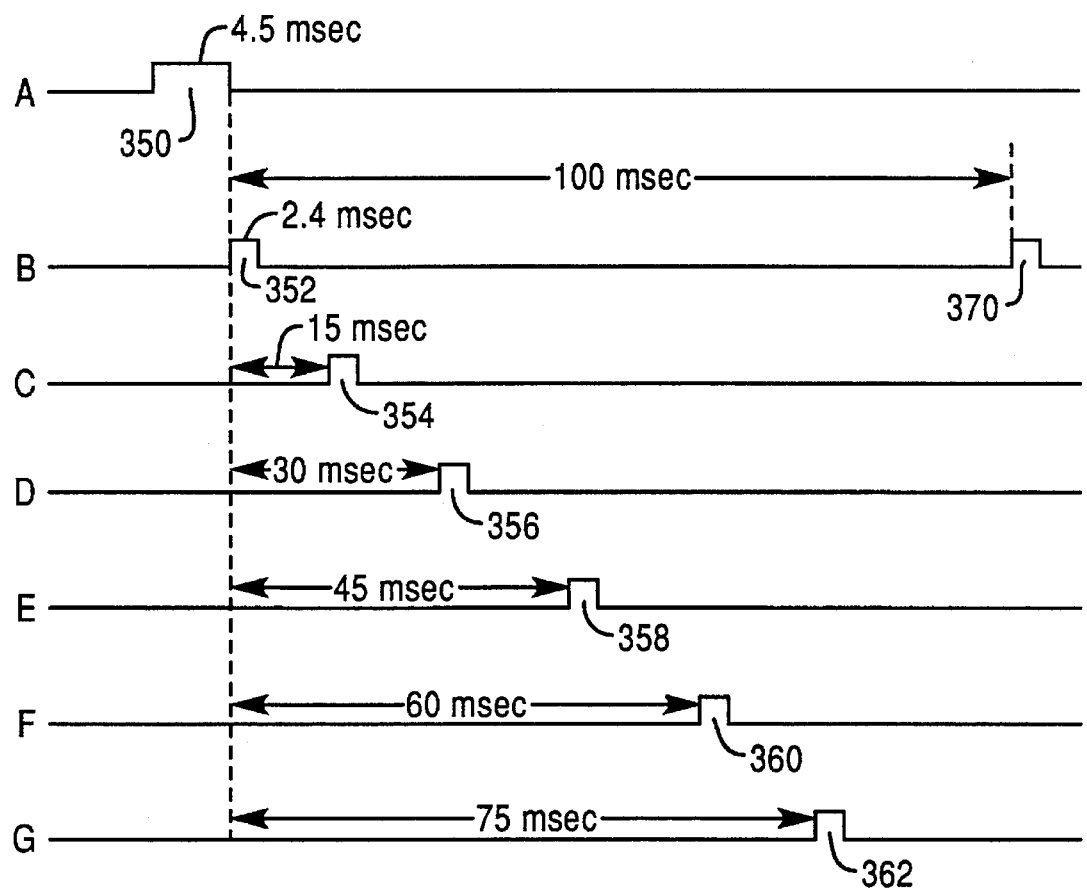
FIG. 3 is a timing diagram illustrating a download operation.

Referring briefly to FIG. 3, line A shows the receipt time 350 by the bridges 18 of a download frame over the 1 Megabit per second wired LAN 12, such frame having a duration of 4.5 milliseconds. Referring to line B, the retransmission by the bridge 18-1 of the download frame is shown as having a 2.4 millisecond time 352, it being appreciated that transmission over the wireless channel is at a 2 Megabit per second rate, and allows for a long preamble time and MAC overhead bits in the transmitted frame. After a 15 millisecond time delay, the bridge 18-2 transmits the download frame. As shown by time durations 356–362 in lines D-G, the remaining bridges 18-3 to 18-6, transmit the download frame with respective delays each 15 milliseconds greater than the delay of the previous bridge. Thus, the download message frames are transmitted by the bridges 18 in non-overlapping fashion, avoiding the possibility of collisions at a terminal which may lie in the coverage area of more than one bridge 18.

Returning again to FIG. 2, it is seen that after transmitting the download frame on the wireless channel (box 258), the bridge waits a further 100 milliseconds (box 260) and then re-sends the download frame on the wireless channel (box 262). This is shown by the 2.4 millisecond time duration 370 in FIG. 3, line B, which represents transmissions by the bridge 18-1. Similarly, although not shown in FIG. 3, the bridges 18-2 to 18-6 re-send the download frame with successive 15 millisecond delays, precisely as for the first transmissions of the download frame shown by time durations 354–362. When a bridge has re-sent the download frame for the second time, it returns to the wait state (box 250, FIG. 2). It should be understood that it is important that the time spacing (200 milliseconds) between the download frames on the wired LAN 12 is substantially greater than the total time to send out a download frame time twice with different time shifts on the six wireless LANs 100, 200, . . . , and 600 (2 ×6×4.5 milliseconds).

It will be appreciated that the duplication of the sending of the download frames makes the receipt of the information contained in a single download frame very reliable with regard to risk of a collision of such a message with an "alive" message or a transaction message both from a neighboring LAN and from its own LAN, particularly bearing in mind the low load factor for alive/transaction messages discussed hereinabove.

Figure 4:
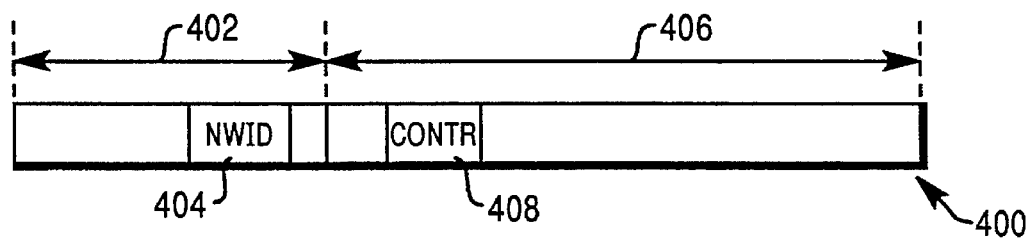
FIG. 4 is a diagram illustrating a format of message frames transmitted in the local area network system.

Referring to FIG. 4, there is shown a representation of a message frame 400 showing the features thereof which are of importance to the subject invention. The message frame 400 includes a Physical Layer preamble portion 402 which includes a network identification (NWID) code field portion 404. The message frame 400 also includes a MAC (Medium Access Control Layer) portion 406 which includes a control field portion (CONTR) 408. The NWID code portion identifies the particular wireless LAN 100, 200, . . . , or 600 to which the message frame relates, as discussed hereinabove. The control field portion 408 identifies the type of MAC frame, for example, a (numbered) information frame, a supervisory frame, or an unnumbered information (UI) frame. It should be understood that the unnumbered information frames contain no individual destination address, and that only these selected frames are subject to the time-shifted and duplicated transmission described hereinabove.

Summarizing, it is seen that there has been described a local area network system wherein a host computer 14 communicates via a wired local area network 12 with a plurality of bridges 18 which communicate via respective wireless LANs 100, 200, . . . , and 600 with terminals 102, 202, . . . , and 602. The bridges 18 normally transmit message frames to the relevant destination station, wherein the spanning tree algorithm determines the message routing. However, certain selected message frames, determined by the bridges to be unnumbered information frames belonging to download messages, are transmitted by the respective bridges 18 in a time-shifted manner, such time-shifted transmission taking place twice for each such selected download message frame.

The described embodiment has several advantages. Thus, a very reliable download session from a host computer to terminals is achieved for wireless channel transmission. A further advantage is that existing application programs for host-terminal system based on a wired LAN can be used with no significant changes. In this connection it will be appreciated that existing application programs for such systems adapted for a retail environment do not generally implement an error recovery procedure for download sessions. The described embodiment avoids the high cost which would be involved in adapting an existing download procedure to provide reliable error recovery. Also, the duration of the download session in the described wireless network system is substantially the same as the duration of the corresponding download session in a wired LAN.

What is claimed is:

1. A method of transmitting message frames from a host computer to a plurality of terminals comprising the steps of:

(a) providing first, second, to $n^{th}$ bridges communicating via respective first ports with said host computer and communicating via respective second ports over a common wireless communication channel with respective wireless local area networks containing respective pluralities of said terminals;

(b) transmitting said message frames from said host computer to said first, second, to $n^{th}$ bridges;

(c) transmitting, when said common wireless communication channel is clear, selected message frames from said first, second, to $n^{th}$ bridges over said wireless communication channel so that each selected message frame is transmitted in non-overlapping sequential time intervals by all of said first, second, to $n^{th}$ bridges so as to avoid the possibility of collisions at a said terminal of one wireless local area network with a said terminal of an adjacent wireless local area network; and (d) retransmitting said selected message frames from said first, second, to $n^{th}$ bridges over said wireless communication channel so that each selected message frame is transmitted in non-overlapping sequential time intervals by all of said first, second, to $n^{th}$ bridges so as to avoid the possibility of collisions at a said terminal of one wireless local area network with a said terminal of an adjacent wireless local area network;

said providing step (a) being effected by:

(a-1) interconnecting said host computer and said bridges in a wired local area network; and said transmitting step (b) being effected by:
(b-1) utilizing a control field included in said message frames to indicate that said selected message frames are unnumbered information frames and contain no individual destination address and that said transmitting and retransmitting steps (c) and (d) are effected upon only said selected message frames.

2. The method as claimed in claim 1 in which said transmitting step (c) and said retransmitting step (d) are effected by:
(c-1) using a Carrier Sense Multiple Access/Collision Avoidance medium access protocol.

* * * * *

UNITED STATES PATENT AND TRADEMARK OFFICE
CERTIFICATE OF CORRECTION

PATENT NO. :  5,519,834
DATED      :  May 21, 1996
INVENTOR(S):  Adriaan Kamerman et al.

It is certified that error appears in the above-indentified patent and that said Letters Patent is hereby corrected as shown below:

On the title page,

Item, "[30], line 2, "Dec. 12, 1991" should be --Dec. 24, 1991--

Signed and Sealed this

Third Day of December, 1996

Attest:

BRUCE LEHMAN

*Attesting Officer*        *Commissioner of Patents and Trademarks*